United States Patent [19]

Wilde et al.

[11] Patent Number: 4,972,817
[45] Date of Patent: Nov. 27, 1990

[54] APPARATUS HAVING A CONTROL MOTOR FOR INTERVENTION INTO A TRANSMISSION DEVICE

[75] Inventors: Werner Wilde, Schwieberdingen; Klaus Loercher, Bad Liebenzell; Alwin Stegmaier, Schwieberdingen, all of Fed. Rep. of Germany

[73] Assignee: Robert Bosch GmbH, Stuttgart, Fed. Rep. of Germany

[21] Appl. No.: 365,399

[22] Filed: Jun. 13, 1989

[30] Foreign Application Priority Data

Sep. 23, 1988 [DE] Fed. Rep. of Germany ....... 3832400

[51] Int. Cl.⁵ ............................................. F02D 11/10
[52] U.S. Cl. .................................... 123/399; 123/361
[58] Field of Search ................................. 123/399, 361

[56] References Cited

U.S. PATENT DOCUMENTS 4,787,353 11/1988 Ishikawa et al. ..................... 123/379
4,848,297 7/1989 Hickmann et al. ............. 123/361 X

FOREIGN PATENT DOCUMENTS 2186024 8/1987 United Kingdom .

OTHER PUBLICATIONS

Bauelemente der Feinmechanik by O. Richter and R. V. Voss, Verlag Technik Berlin, 1957, p. 417.

*Primary Examiner*—Tony M. Argenbright
*Attorney, Agent, or Firm*—The Firm of Edwin E. Greigg

[57] ABSTRACT

An apparatus for motor vehicles having traction control and/or anti-lock brakes. In a known apparatus, a distinction can be made between an unregulated and a regulated operating stage. In the regulated operating state, the position of a control device is determined by means of a control motor. In the unregulated operating state, a position of an operating element is transmitted to a control device with the aid of the transmission device. When the operating element is adjusted and the control device is restored by a restoring spring, however, a rotor of a control motor is adjusted along with them. This requires great actuation forces and a strong restoring spring. In this system, a third rotary element is provided. In the unregulated operating state, the third rotary element returns to a position of repose. In that case there is then no longer any operative connection between the transmission device and the control motor. The control device can thus be adjusted by the operating element with relative slight actuating forces. Nor is a relatively strong restoring spring necessary. Even if an electronic control system should fail, the control device can be adjusted without problems via the operating element. The apparatus is particularly suitable for motor vehicles having traction control and/or anti-lock brakes.

38 Claims, 5 Drawing Sheets

APPARATUS HAVING A CONTROL MOTOR FOR INTERVENTION INTO A TRANSMISSION DEVICE

BACKGROUND OF THE INVENTION

The invention is based on an apparatus having a control motor for intervention into a transmission device between an operating element and a control device that determines the output of a driving engine.

Various regulating operations for driving engines require an intervention into the transmission device between the operating element, such as a gas pedal, and the control device, such as a throttle valve in an Otto engine or an adjusting lever in a Diesel engine or the like. The regulation may be effected by regulating devices known per se, for instance to avoid slip between vehicle wheels driven by the engine and a road surface.

In a known apparatus of this type, the operating element is operatively connected to a first lever, for instance via a cable, and the control device is operatively connected to a second lever, for instance via a further cable. A restoring spring tends to urge the control device into a terminal position. A tension spring acts on the one hand on the first lever and on the other on the second lever, tending to press a stop of the first lever against a stop of the second lever. The effect of the tension spring is greater than the effect of the restoring spring. A control motor may also act upon the second lever, such that the second lever is rotated relative to the first lever, counter to the tension spring, and can thus move the two stops away from one another. On the rotation of the second lever relative to the first lever, the position of the control device can be varied relative to the position of the operating element. The control motor acts upon the second lever in the direction of the restoring spring, counter to the tension spring.

A distinction can be made between two operating states of the transmission device: an unregulated operating state, and a regulated state.

In the unregulated operating state, the control motor is not triggered. A particular position of the control device is associated with a particular position of the operating element. The control device follows the operating element in accordance with a predetermined transmission ratio.

In the regulated operating state, the transmission ratio is varied by the control motor. First, the operating element specifies a position. This position would be equivalent to a particular position of the control device in the unregulated operating state. In the regulated operating state, however, the control motor is triggered, which has the effect that the control device assumes a position different from the position in the unregulated operating state.

In the unregulated operating state, that is, when the control motor is not triggered, a rotor of the control motor must be jointly actuated when the operating element is actuated, in order to change the position of the control device. This requires greater actuating forces upon actuation of the control device. To avoid having to design a restoring spring with an overly great force, a proposal has been made that a free-wheel be installed between the control motor and the second lever. However, the free-wheel can lower the actuating forces in only one actuation direction.

OBJECT AND SUMMARY OF THE INVENTION

The apparatus according to the invention has an advantage over the prior art that by introducing a third rotary element between the second rotary element and the rotor of the control motor, no increased actuating forces are brought about in the unregulated operating state upon actuation of the operating element by the apparatus. Because of the third rotary element, it is possible upon actuation of the operating element to adjust the control device without having to move the rotor of the control motor along with it.

Modifications of and improvements to the apparatus are defined herein. In particular, at least the following advantages are attained:

Disposing all three rotary elements coaxially on one shaft results in a particularly simple, compact construction.

The apparatus may be embodied such that via the third rotary element, the second rotary element is rotatable by the control motor in a direction of reduced and/or in the direction of increased output of the driving engine.

The rotation by the control motor in the direction of increased output can be limited to a maximum allowable angle of rotation beta ($\beta$), and the rotation in the direction of lesser output of the driving engine can likewise be limited to a maximum allowable angle of rotation gamma ($\gamma$).

By providing the second rotary element with an eccentrically disposed knob protruding axially from it and by providing the third rotary element with a recess that can be engaged by the knob, with the length of the recess in the circumferential direction being greater than the length of the knob, again in the circumferential direction, the second rotary element can be rotated freely relative to the third rotary element by the amount by which the circumferential length of the recess exceeds that of the knob.

When the control motor is not being triggered, a reverse torsion spring means can move the third rotary element into a position of repose. The position of repose of the third rotary element may be selected such that given sufficient play between the knob and the recess in the third rotary element, the control device can be adjusted from a position of minimal output of the driving engine to a position of maximum output of the driving engine, without having to move the third rotary element and hence the rotor of the control motor along as well.

A gear can advantageously be disposed between the third rotary element and the control motor. The reverse torsion spring means may comprise a spring one end of which can act directly upon the third rotary element. This requires a spring with only relatively short spring travel. On the other hand, it is also possible for the reverse torsion spring means to comprise at least one spring that acts indirectly upon the third rotary element via the gear. In conventional control motors, the gear typically must be embodied such that a high rotor rpm corresponds to a low rpm of the third rotary element. Stepping down from high rpm to low rpm, however, simultaneously means a step up from a low torque to a high torque. It is therefore also possible to use an indirectly acting spring of only relatively low force or low torque.

Embodying the reverse torsion spring as a spring subjected to bending or a flat band spring subjected to bending results in a particularly favorable construction. The spring may be wound approximately in a circular arc, or may have the form of a spiral spring. This allows the reverse torsion spring to be disposed particularly favorably and space-savingly, coaxially with the third rotary element or coaxially with a drive wheel of the gear.

The control motor, the gear and the shaft for the rotary elements may be disposed on a common base plate. A particularly favorable construction is obtained if the control motor is joined to the base plate such that a drive wheel connected to the rotor protrudes variably far into a recess in the base plate or through to the other side of the base plate, where it can drive the drive wheels of a gear. The shaft for the rotary elements is likewise joined to the base plate, on the side remote from the control motor.

Usually, the transmission device between the operating element and the control device substantially comprises a Bowden cable. For introducing the apparatus according to the invention, the Bowden cable can be severed at virtually any arbitrary point. The operating element can then be operatively connected to the first rotary element via a first Bowden cable and the second rotary element can be operatively connected to the control device via a second Bowden cable. The fixation points for a Bowden cable sheath can also be secured to the base plate.

One or more fastening holes can be provided in the base plate, and as a result the entire apparatus can be secured to a chassis, e.g. to the body in the case of a motor vehicle. The selection of where to install the apparatus is relatively flexible. It is then possible to attach the apparatus where there is little vibration; in that case a relatively simple, inexpensive electric motor can be used as the control motor.

The entire apparatus can be protectively encased in a housing having only a few recesses. The connection between the operating element and the first rotary element is effected through one of the recesses; the connection betweeen the second rotary element and the control device is effected through another; and the lines for triggering the control motor are ducted through a third recess. The apparatus is fastened to the chassis through a further recess or recesses. However, the housing may also be in two parts. One part of the housing, for instance, may cover the control motor on one side of the base plate, and another part of the housing may cover the rotary elements and the gear.

The tension spring that acts on both the first rotary element and the second rotary element is advantageously embodied as a spring subjected to bending. It is particularly favorable for the tension spring to be embodied as a flat-band spring subjected to bending and to be wound in the form of a spiral spring. This makes it possible to dispose the tension spring approximately coaxially with and between the first and second rotary elements.

Particularly advantageous regulation is attained if the position of the control device can be detected with the aid of a travel measuring system.

The invention will be better understood and further objects and advantages thereof will become more apparent from the ensuing detailed description of preferred embodiments taken in conjunction with the drawings.

DESCRIPTION OF THE PREFERRED EMBODIMENTS

The structure and mode of operation of an apparatus embodied in accordance with the invention, having a control motor for intervention into a motion transmission device 1, 66 between an operating element 3 and a control device 6 (FIG. 2) that determines the output of a driving engine will now be described in detail in terms of two exemplary embodiments, referring to FIGS. 1-5.

Figure 1:
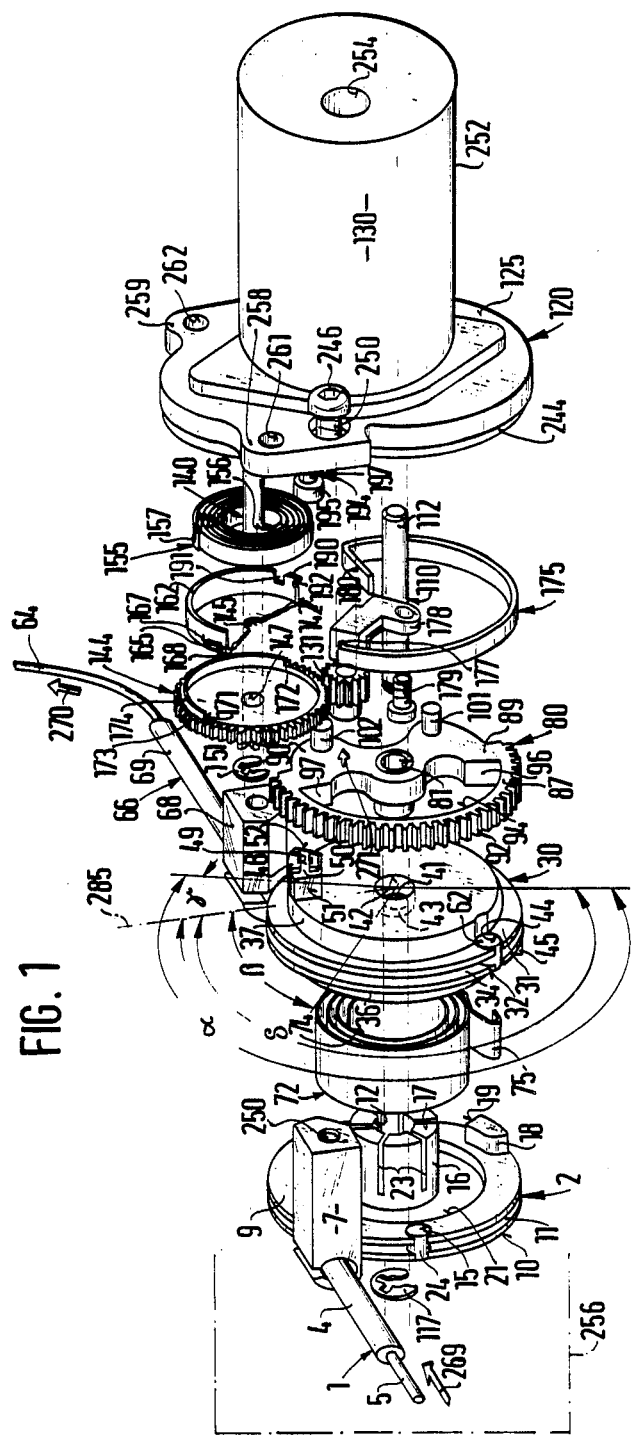
FIGS. 1 and 2 show a first exemplary embodiment of the invention in an exploded view from two different angles.
Figure 2:
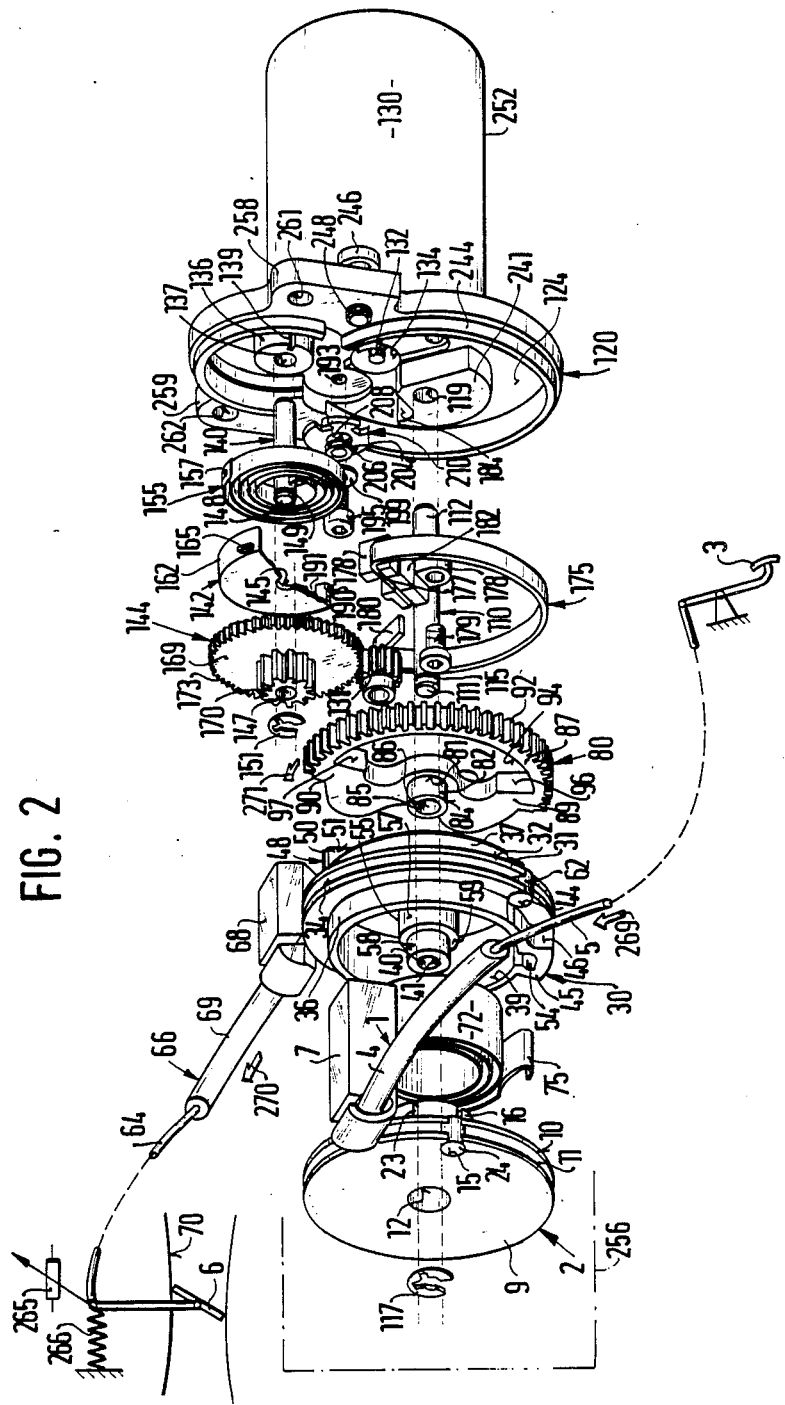
Figure 4:
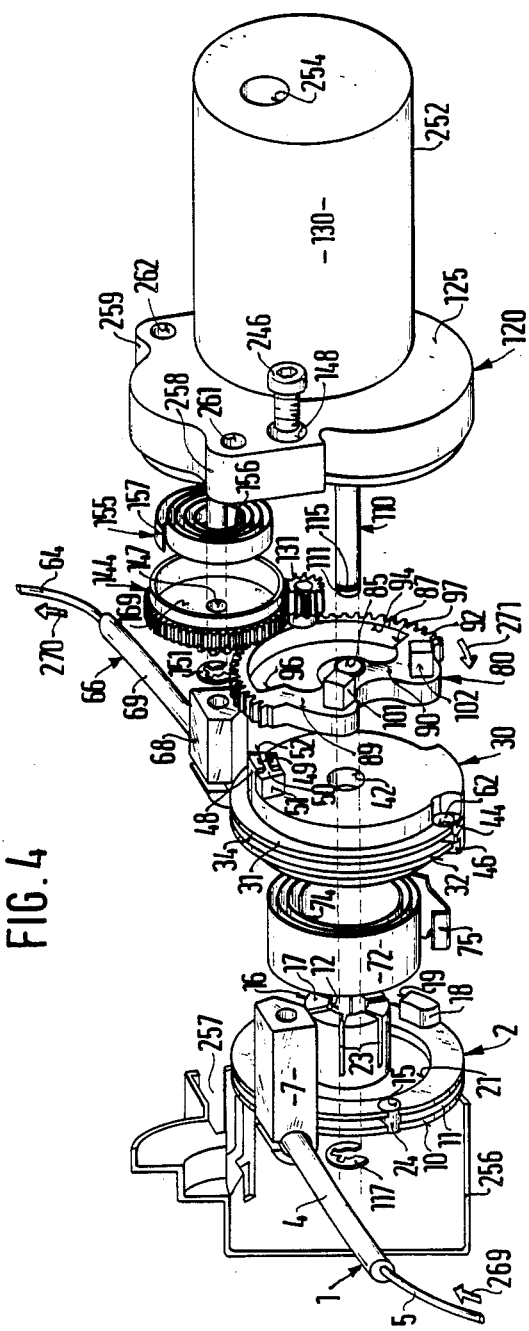
FIGS. 4 and 5 show a second exemplary embodiment, again in an exploded view.
Figure 5:
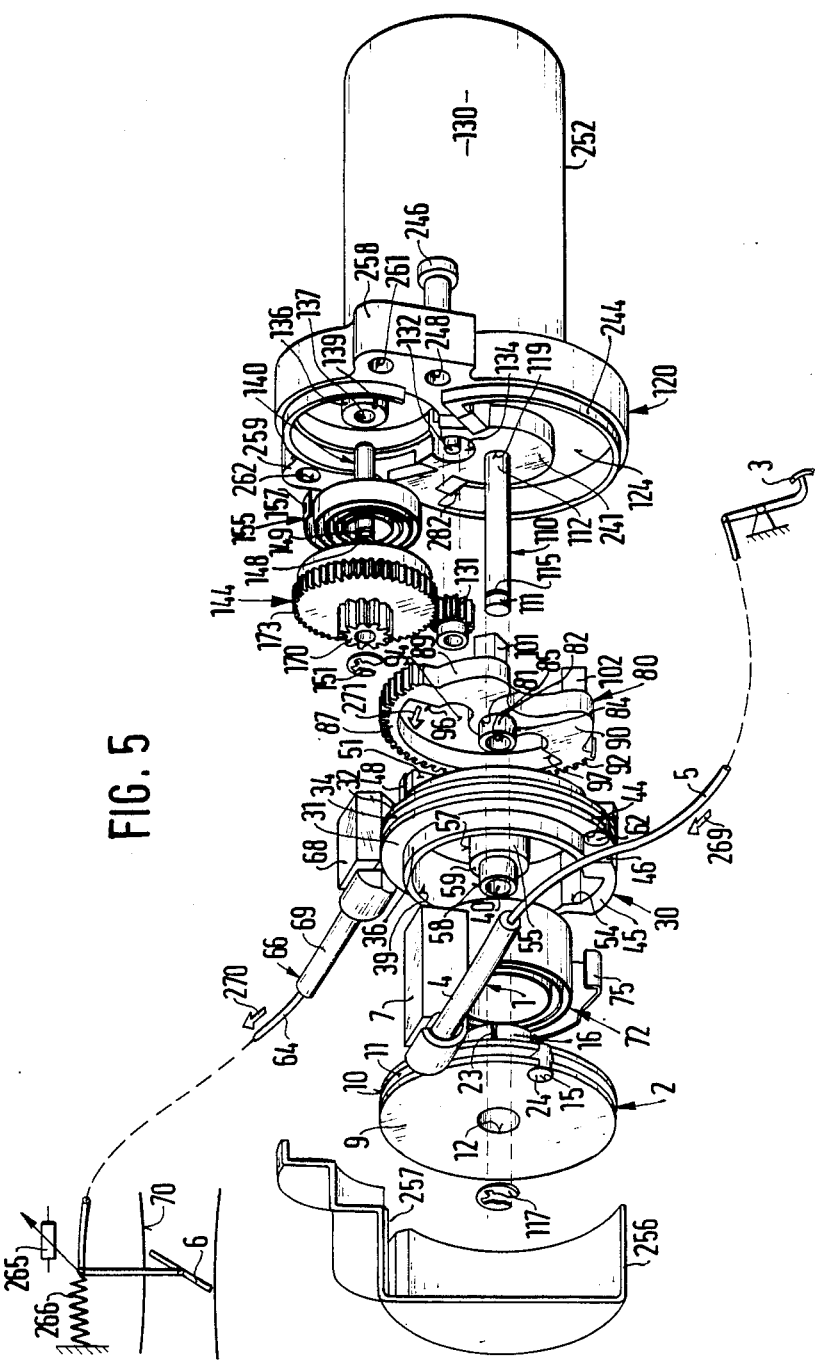

FIGS. 1 and 2 show the first exemplary embodiment, and FIGS. 4 and 5 show the second exemplary embodiment, in each case from different angles. For the sake of easier comprehension of the drawings, the distances between individual components of the apparatus have been exaggerated; the parts have been shown in spaced relationship. FIGS. 1, 2, 4 and 5 are so-called exploded views. In all the drawing figures, identical or identically functioning parts have been identified by the same reference numerals. To make the association of the various components with one another clearer, existing axes and shafts have been shown extended with dashed lines.

From the operating element 3 (FIGS. 2 and 5), embodied for instance as a gas pedal, a first part 1 of the transmission device leads to a first rotary element 2. In both exemplary embodiments shown, the first part 1 of the transmission device comprises a Bowden cable, with a Bowden cable sheath 4 and a Bowden cable core 5. Of the sheath 4, only a portion adjoining the apparatus has been shown. The portion of the sheath 4 adjoining the apparatus is fixed to a first retaining means 7. The first rotary element 2 substantially comprises a disk 9 having an outer circumference 10; with a radial groove 11 cut into the outer circumference 10; a central through bore 12, an eccentric bore 15 intersecting the groove 11 in the vicinity of the outer circumference 10; a cylindrical, axially protruding spring guide element 16 having a face end 17 remote from the disk 9; a protrusion 18 having a stop 19 protuding axially from the disk 9 on the same side as the spring guide element 16 and located in the vicinity of the outer circumference 10; and an axial recess 21 in the disk 9 that is likewise provided on the same side as that of the spring guide element. A plurality of radial slits 23 are provided in the spring guide element 16. The Bowden cable sheath 4 of the first part 1 of the transmission device ends in the vicinity of the first retaining means 7. The Bowden cable core 5 protrudes from the sheath 4 resting in the groove 11 and wraps partway around the disk 9. One end of the core 5 is connected to a bolt 24 that is placed in the eccentric bore 15.

A second rotary element 30 is supported coaxially with the first rotary element 2. The second rotary element 30 essentially has the following segments: a disk 31 having an outer circumference portion 32 with an axial groove 34 provided in the outer circumference portion 32; the outer circumference portion is narrower than the main body of the disk 31 which is formed with surface faces 36 and 37 on opposite sides of the outer circumference portion 32; face 36 is oriented toward the first rotary element 2; and the face 37 is opposite face 36 the face remote from the first rotary element; an axial recess 39 is formed in the second rotary element 30 from the side including face 36; the rotary element 30 includes a central through bore 40, and an eccentric bore 44 in the vicinity of the outer circumference 32. The though bore 40 is divided into an axial region 41 of somewhat smaller diameter and an axial region 42 of somewhat larger diameter. A step 43 divides the bore 40 into a first and second region 56 and 57. The faces 36 and 37 are not rotationally symmetrical, that is they are not completely cylindrical; instead, face 36 has a bulging part 45 with a stop 46 and a knob 48 protrudes from the face 37. A slit 49 is provided in the knob 48 in which an elastomer molded element 50 is placed. The elastomeric molded element 40 protrudes in the rotational direction past the knob 48 on two sides and on each side forms a respective stop face 51 and 52. The axial recess cut 39 is also not rotationally symmetrical on its outer circumference but instead has an additional radial recess 54 extending variably into the bulging part 45 on the face 36. Located inside the axial recess 39, centrally to the through bore 40, is a guide element 55, which is connected to the disk 31 and is stepped on its outer circumference. The guide element 55 includes the first outer diameter region 57, beginning at the disk 31, and the smaller second outer diameter 58. Between the two outer diameters 57 and 58 is a step 59. A bolt 62 is placed in the eccentric bore 44. One end of a Bowden cable core 64 of a second part 66 of the transmission device is secured on the bolt 62. Part of the core 64 is located in the groove 34 and wraps partway around the outer circumference portion 32 of disk 31 of the second rotary element 30. From the second rotary element 30, the core 64 leads to a Bowden cable sheath 69 connected to a second retaining means 68. The core 64 and sheath 69, as a component of the second part 66 of the transmission device, lead to the control device 6, embodied for instance as a throttle valve, which is for instance disposed in the air intake tube 70 of an internal combustion engine, not shown.

A tension spring 72 in the form of a spiral is located between the first rotary element 2 and the second rotary element 30. It is located partly inside the axial recess of the second rotary element 30 and partly inside the axial recess 21 in the first rotary element 2. A first folded-over end 74 on the inner spiral of the tension spring 72 is inserted into one of the radial slits 23 of the spring guide element 16 on the first rotary element 2. A second folded-over end 75 on the outer spiral of the tension spring 72 engages the recess 54 in the bulging part 45 of the second rotary element 30. The second outer diameter 58 on the guide element 55 of the second rotary element 30 is somewhat smaller than the central through bore 12 of the first rotary element 2, and the first outer diameter 57 is markedly larger than the central through bore 12. The guide element 55 can therefore be thrust some distance into the through bore 12 of the first rotary element 2, until the face end 17 of the spring guide element 16 comes to rest on the step 59 of the guide element 55.

On the side of the second rotary element 30 remote from the first rotary element 2, a third substantially semi-circular rotary element 80 is disposed concentrically to the two rotary elements 2 and 30. The third rotary element has a center bore 81. A guide bushing 82 is seated in the center bore 81. The guide bushing 82 protrudes variably far out of the side of the third rotary element 80 oriented toward the second rotary element 30. The guide bushing 82 has an outer diameter 84, a center bore 85 and a face end 86. The third rotary element 80 also has a substantially semicircular partial ring 87 on its outside. Two spokes 89 and 90 extend inward from the partial ring 87 and merge with one another, encompassing the center bore 81. A tooth profile 92 extends over the circumference of the partial ring 87. The partial ring 87 extends over only a part of the outer circumference of the third rotary element 80. A recess 94 is formed inside the third rotary element 80, between the partial ring 87 and the two spokes 89 and 90. A bearing face 96 is formed on the spoke 89, oriented toward the recess 94. A bearing face 97 is formed on the spoke 90, likewise oriented toward the recess 94. A boltlike attachment 101 protrudes axially from the spoke 89 and a further boltlike attachment 102 protrudes axially from the spoke 90 on the third rotary element 80, on a side remote from the second rotary element 30. The part of the guide bushing 82 protruding from the third rotary element 80 on the side oriented toward the second rotary element 30 fits with slight play into the region 42 of the through bore 40, until the face end 86 comes to rest on the step 43 of the second rotary element 30.

The third rotary element 80 is supported on a shaft 110. The second rotary element 30 is also supported, together with the first rotary element 2, on the shaft 110. The shaft 110 is somewhat longer than the assembly comprising the first rotary element 2, the second rotary element 30 and the third rotary element 80. The shaft 110 has a first end 111, and a second end 112. The first end protrudes past the assembly comprising the three rotary elements on the side where the first rotary element 2 is located. The first end 111 has an annular groove 115, into which a retaining ring 117 can be snapped. The second end 112 of the shaft 110 is firmly joined in a bore 119 to a base plate 120.

The base plate 120 has a first side 124 and a second side 125. The first side 124 faces the rotary elements 2, 30 and 80, and the second side 125 is located on the opposite side of the base plate 120 from the first side 124.

A control motor 130 is disposed on the second side 125 of the base plate 120. Fastening elements such as screws for securing the control motor 130 to the base plate 120 are not shown in the drawing for the sake of simplicity. A rotor 132 protrudes from the face end of the control motor 130 oriented toward the base plate 120 and into a connecting bore 134. Since the rotor 132 is partly covered by either the base plate 120 or the control motor 130, only a stub of the rotor 132 is visible (FIGS. 2 and 5). A first drive wheel 131 of a gear is mounted on the rotor. For the sake of clarity, the first drive wheel 131 is shown in FIGS. 1, 2, 4 and 5 spaced apart from the control motor 130; in actuality, it is joined to the rotor 132 of the control motor 130. The connecting bore 134 is located in the base plate 120 between the first side 124 and the second side 125. The diameter of the connecting bore 23 in the first rotary element 2 is greater than an outer diameter of the first drive wheel 131 and is provided such that when the control motor 130 is fastened to the base plate 120, the first drive wheel 131 secured to the rotor 132 can be inserted into the connecting bore 134 of the base plate 120. The first drive wheel 131 protrudes variably far from the first side 124 of the base plate 120.

A stub 136, with a bore 137 in its center, is located on the first side 124 of the base plate 120. A notch 139 is provided along a jacket line of the stub 136. In the bore 137, a second shaft 140 is firmly connected to the stub 136 and thus to the base plate 120. A plate wheel 142 (FIGS. 1, 2 and 3) and a second drive wheel 144 are both rotatably supported on the second shaft 140. In the second exemplary embodiment (FIGS. 4 and 5), the plate wheel 142 is omitted and formed as a portion of the second drive wheel 144. The second shaft 140 protrudes through a central bore 145 in the plate wheel 142 and through a bore control 147 in the second drive wheel 144 and out of the second drive wheel 144 with one end 148, remote from the bore 137 in the base plate 120. On the end 148 of the second shaft 140 protruding past the second drive wheel 144, an annular groove 149 is provided. A retaining ring 151 can be snapped into the annular groove 149. The retaining ring 151 prevents the second drive wheel 144 and plate wheel 142 from sliding down off the second shaft 140. A first reverse torsion spring 155 is located between the plate wheel 142 and the first side 124 of the base plate 120. The reverse torsion spring 155 is a spring subjected to bending and takes the form of a spiral spring. The reverse torsion spring 155 surrounds the stub 136. An inner or first end 156 of the reverse torsion spring 155 engages the notch 139 of the stub 136. An outer or second end 157 of the reverse torsion spring 155 is pivotably connected to the plate wheel 142 (FIGS. 1, 2 and 3) or to the second drive wheel 144 (FIGS. 4 and 5). A polygonal first dog 165 protrudes radially outward from and beyond a cylindrical rim 162 of the plate wheel 142 (FIGS. 1 and 2). The dog 165 has a first stop end 167 and a second stop end 168, seen in the circumferential direction. The second drive wheel 144 substantially comprises a first disk portion 169 and a second disk portion 170. A first stop edge 171 and a second stop edge 172 (FIGS. 1 and 2) are provided on a side of the first disk portion 169 of the second drive wheel 144 toward the plate wheel 142. The two stop edges 171, 172 are embodied on a collar 174, axially engaging the outside of the plate wheel 142, and are disposed such that on a rotation of the second drive wheel 144, depending on the direction of rotation, either the first stop edge 171 comes to rest on the first stop end 167 of the plate wheel 142, or the second stop edge 172 comes to rest on the second stop end 168. In the second exemplary embodiment (FIGS. 4 and 5), the two stop edges 171, 172 are unnecessary and so are not provided. The first disk portion 169 has a larger diameter than the second disk portion 170. The first disk portion 169 and the second disk portion 170 are each provided with a toothed profile 173 on the outer circumference. A toothed profile of the first drive wheel 131 meshes with the toothed profile of the first disk portion 169 of the second drive wheel 144, and a toothed profile of the second disk portion 170 of the second drive wheel 144 meshes with the toothed profile on the partial ring 87 of the second rotary element 80.

A second dog 190 also protrudes radially from and beyond the cylindrical rim 162 of the plate wheel 142. Respective recesses 191 and 192 (FIGS. 1, 2 and 3) are provided in the cylindrical rim 162, on either side of the second dog 190 as seen in the circumferential direction.

In the first exemplary embodiment (FIGS. 1 and 2, a second reverse torsion spring is shown at 175. The second reverse torsion spring 175 is a spring subjected to bending and has the shape of a flat-strip spring curved in an arc. The reverse torsion spring 175 has two ends. The first spring end 177 is bent at an angle and is joined to the base plate 120 with the aid of a seat 178 and a screw 179. A stop plate 182 is integrated with the seat 178. Depending on the position of the third rotary element 80, the second spring end 180 can either rest on a stop 184 protruding from the first side 124 of the base plate 120 or it can come to rest on the bolt 102 of the third rotary element 80. The second reverse torsion spring 175 is absent in FIGS. 4 and 5.

In the first exemplary embodiment (FIG. 1-3), the two reverse torsion springs 155 and 175 form a reverse torsion spring means. In the second exemplary embodiment (FIGS. 4 and 5), the reverse torsion spring means is embodied by the first reverse torsion spring 155 alone.

Figure 3:
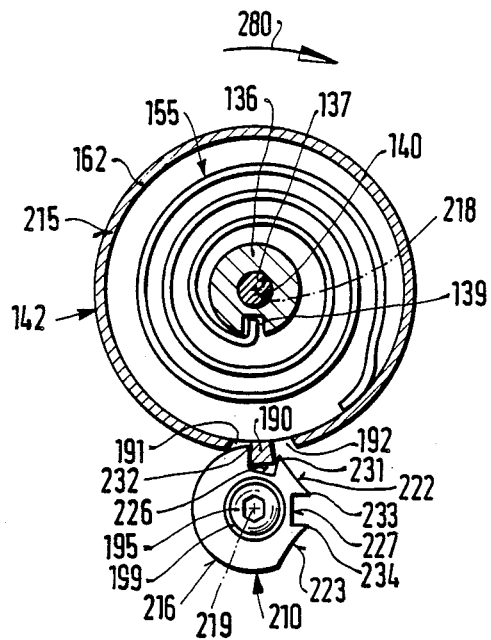
FIG. 3 shows a detail of the spring connection of the first exemplary embodiment.

The second exemplary embodiment (FIGS. 4 and 5) includes fewer parts than the first exemplary embodiment (FIGS. 1, 2 and 3). Among others, the details to be described below, identified by reference numerals 193–234, are found only in the first exemplary embodiment (FIGS. 1-3). FIG. 3 therefore applies only to the first exemplary embodiment.

In the first exemplary embodiment (FIGS. 1-3), a third bore 193 having an internal thread is located in the base plate 120, on the first side 124. A screw 194 having a head 195 and a shaft 197 is screwed into the third bore 193. A washer 199 and a sheath 204 are disposed between the screw head 195 and the base plate 120. The diameter of a hole in the washer 199 and the diameter of a hole in the sheath 204 are somewhat larger than the diameter of the screw shaft 197, so that this shaft can be passed through the washer 199 and sheath 204. The length of the shaft 197, the thickness of the washer 199, the length of the sheath 204 and the depth of the bore 193 having the thread are matched to one another in such a way that the screw 194 can be screwed far enough into the third bore 193 that the washer 199 and sheath 204 are firmly fastened between the screw head 195 and the base plate 120. The washer 199 and the sheath 204 are disposed on the screw shaft 197 such that the washer 199 rests on the screw head 195 and the sheath 204 rests on the base plate 120. The sheath 204 has an outer diameter 206. The outer diameter 206 is somewhat smaller than the diameter of a hole 208 in a star wheel 210. The star wheel 210 is located between the washer 199 and the base plate 120 and surrounds the sheath 204. Since the star wheel 210 is not as long as the sheath 204, the star wheel 210 can rotate freely even when the screw 194 is firmly tightened.

The plate wheel 142 with the second dog 190 and the star wheel 210 have a special appearance, adapted to one another, which will now be described in greater detail referring to FIG. 3. FIG. 3 shows a section transversely through the cylindrical rim 162 of the plate wheel 142, such that the section also extends through the second dog 190 and through the two recesses 191 and 192. Also shown in section are the stub 136 with the bore 137 and the notch 139 as well as the second shaft 140. FIG. 3 is a view vertically on a portion of the first side 124 of the base plate 120, onto the reverse torsion spring 155, the star wheel 210, the washer 199 and the screw head 195, as well as on the above-described section through the plate wheel 142. The plate wheel 142 has a circumference 215 and the star wheel 210 has a circumference 216 that is interrupted in a suitable manner. The plate wheel 142 has an axis of rotation 218 and the star wheel 210 has an axis of rotation 219. The distance between the axis of rotation 218 and the axis of rotation 219 is shorter than the sum of the radius of the circumference 215 plus the radius of the circumference 216. The plate wheel 142 and the star wheel 210 cooperate in a similar manner to a so-called single-tooth or Maltese cross gear known per se, and therefore its function will be described only briefly here. The star wheel 210 can assume only a position in which the cylindrical rim 162 of the plate wheel 142 can assume at least some distance into a first indentation 222 or into a second indentation 223 of the star wheel 210, and with each rotation of the plate wheel 142, the second dog 190 comes to mesh with the first notch 226 or the second notch 227 of the star wheel 210, depending on the rotational direction. The first notch 226 is delimited from the first indentation 222 by a point 231 and from the circumference 216 by an edge 232. The second notch 227 is delimited from the two indentations 222 and 223 by points 233 and 234. To enable the second dog 190 to enter into engagement with one of the notches 226 or 227 upon a rotation of the plate wheel 142, the edge 232 and the points 231, 233 and 234 must be capable of extending into one of the recesses 191 or 192.

The control motor 130 flanged to the second side 125 of the base plate 120 is covered with a hood 252. Located in the hood is an aperture 254, through which electrical lines, not shown, for supplying energy to and triggering the control motor 130 can be ducted. The parts of the apparatus disposed on the first side 124 can also be covered, with a second hood 256. The hood 256 is indicated in FIGS. 1 and 2 only by dot-dash lines, for the sake of clarity. The hood 256 has two recesses 257, only one of which is shown in FIGS. 4 and 5. The first part 1 of the transmission device is passed through the first recess 257, and the second part 66 of the transmission device is passed through the second recess 257. Located between the hood 252 and the hood 256 is the base plate 120, from which two corners 258 and 259 extend laterally past the hoods 252 and 256. One aperture each 261 and 262 is located in the corners 358 and 259. With these apertures 261 and 262, the base plate 120 and hence the entire apparatus can be secured, for instance with screws, not shown, to an arbitrary chassis, also not shown, such as a vehicle body.

Experiments have shown that the outcome of the intervention into the transmission device is better if the position of the control device 6 can be detected with a travel measurng system 265, such as a potentiometer. Measurement signals originating in the travel measuring system 265 can then be processed by a suitable electronic control unit, along with further set-point variables, to make control signals with which the control motor 130 is triggered.

In the apparatus having the transmission device 1, 66, a distinction can be made, as described above, between two operating states: an unregulated operating state and a regulated operating state.

In the unregulated operating state, the control motor 130 is not triggered. Because of the reverse torsion spring means, the third rotary element 80 is in a position of repose. The position of the third rotary element 80 can be defined structurally by providing that the first rotary element 2 and the second rotary element 30 can be rotated into any desired position, without one of the stop faces 51 and 52 of the second rotary element 30 coming to rest on one of the bearing faces 96 and 97 of the third rotary element 80. Thus, the first two rotary elements 2 and 30 can be rotated without having to rotate the rotor 132 of the control motor 130.

Pivotably connected to the first part 1 of the transmission device, in this exemplary embodiment the Bowden cable, are the operating element 3, on one end, and as described the first rotary element 2, on the other. Pivotably connected to the second part 66 of the transmission device are the second rotary element 30 on one side, as described above, and the control device 6, on the other. With the tension spring 72, the first end 74 of which can act upon the first rotary element 2 and the second end 75 of which can act upon the second rotary element 30, the stop 19 of the first rotary element 2 is pressed in the direction toward the stop 46 of the second rotary element 30. The tension spring 72 is installed with initial tension between the two rotary elements 2 and 30. Basically, it would suffice for a single radial slit 23 to be provided in the first rotary element 2 to receive the first end 74 of the tension spring 72. By providing a plurality of slits 23 in the first rotary element 2, however, the initial tension of the tension spring 72 can be adjusted in relatively small stages.

The first rotary element 2 is guided in the axial and radial directions by the guide element 55 having the two outer diameters 57 and 58 and having the step 59 and by the central through bore 12 in the first rotary element 2. However, the through bore 40 of the second rotary element 30 may also be embodied somewhat larger, so that a bushing can be inserted into it, onto which the first rotary element 2 and the second rotary element 30 are then mutually guided. By the initial tension of the spring 72 and the mutual guidance of the first rotary element 2 and second rotary element 30, these two rotary elements together with the tension spring 72 form a compact unit that is easy to install.

The first rotary element 2 is moved via the first part 1 of the transmission device. In the unregulated operating state, a movement of the first rotary element 2 is transmitted directly to the second rotary element 30, and its movement in turn is transmitted via the second part 66 of the transmission device to the control device 6. An adjustment of the operating element 3 and hence of the Bowden cable core 5 in a direction represented by an arrow 269 effects an identical adjustment of the Bowden cable core 64 and hence of the control device 6 in the direction represented by a further arrow 270. If the operating element 3 is adjusted in the direction counter to the arrow 269, the situation is comparable. There is a unique relationship between one position of the operating element 3 and one position of the control device 6.

In self-propelled machines, such as passenger cars, it is typically not possible to transmit both tensile and compressive forces with the transmission device. If that is the case, then a force of a restoring spring 266, disposed for instance on the control device 6, must be capable of returning the control device 6 to an initial position. With an operating force engaging the operating element 3, the control device 6 is then moved variably far away from its initial position by means of the transmission device. The restoring spring 266, however, acts upon the second rotary element 30 as well, counter to the tension spring 72. Since in the unregulated state the second rotary element 30 must not be allowed to execute any motion relative to the first rotary element 2, the force of the tension spring 72 must be greater than the force of the restoring spring 266, and frictional forces in the transmission device must be taken into account in this connection as well. If tensile and compressive forces can be transmitted with the transmission device, as is sometimes the case with stationary engines, then the restoring spring 266 can optionally be dispensed with and the tension spring 72 can be made weaker.

To reduce the weight and/or to enable simple installation and/or observation of the tension spring, recesses, not shown in the drawing, may be provided in the disk 9 of the first rotary element 2 and/or in the disk 31 of the second rotary element 30.

The third rotary element 80 is guided in the axial and radial directions with the aid of the guide bushing 82 in the central through bore 40 of the second rotary element, in the region having the greater diameter 42 and the step 43. This makes the third rotary element 80 easy to install, along with the second rotary element 30 and the first rotary element 2, on the first shaft 110 firmly connected to the base plate 120. However, the rotary elements 2, 30, 80 may instead be embodied in such a way that they are guided solely and directly on the first shaft 110.

The knob 48 on the second rotary element 30 having the elastomeric molded part 50 with the stop faces 51 and 52 protrudes into the recess 94 of the third rotary element 80. The recess 94 must provide enough room so that on the adjustment of the two rotary elements 2 and 30 from a desired rotated position to a second rotated position, the stop faces 51 and 52 of the second rotary element 30 do not come to rest on the bearing faces 96 and 97, if the third rotary element 80 is in its position of repose. In the unregulated operating state, this makes an adjustment of the control device 6 by means of the operating element 3 possible entirely without the influence of the control motor 130.

Instead of providing the knob 48 on the second rotary element 30, the knob 48 can also be provided on the third rotary element 80 and the recess 94 can be provided on the second rotary element 30.

The knob 48 having the stop faces 51, 52 of the second rotary element 30, together with the recess 94 and the bearing faces 96, 97 of the third rotary element 80, forms a coupling. In the regulated operating state, one of the stop faces 51, 52 comes to rest on one of the bearing faces 96, 97; that is, the coupling is operative. In the unregulated operating state, the stop faces 51, 52 can move away from the bearing faces 96, 97; that is, the coupling is inoperative. Accordingly, there is a coupling 48, 51, 52, 94, 96, 97 existing between the second and third rotary elements 30 and 80, that is not operative in certain positions of these rotary elements 30, 80 relative to one another.

If the diameter of the groove 11 of the first rotary element 2 is equal to that of the groove cut 34 of the second rotary element 30, then in the unregulated operating state, upon adjustment of the Bowden cable core 5 of the first part 1 of the transmission device by a certain amount, the Bowden cable core 64 of the second part 66 of the transmission device adjusts by precisely the same amount. On the other hand, if the two diameters differ, then the transmission of an adjustment of the core 5 to the core 64 is either reinforced or diminished. The grooves 11 and 34 of the two rotary elements 2 and 30 need not necessarily be circular, nor need they be necessarily centered with respect to the through bores 12 and 40. If at least one of the grooves 11, 34 is not central to the corresponding through bore 12, 40 and/or if one of the grooves is in the form of a cam, for example, then the transmission ratio between the first part 1 and the second part 66 of the transmission device can be defined arbitrarily within wide limits as a function of the rotational angle of the rotary elements 2, 30. For low power ranges of the driving engine, a relatively high transmission ratio can be selected, for example, and for high power ranges a relatively low transmission ratio can be selected.

With the apparatus shown as an example in FIGS. 1 and 2, the core 64 of the second part 66 of the transmission device and hence the control device as well can be adjusted by the control motor 130, in the regulated operating state, both in the direction of the arrow 270 and in the opposite direction. In the apparatus shown in FIGS. 4 and 5, an adjustment of the Bowden cable core 64 of the second part 66 of the transmission device and hence of the control device 6 by the control motor is intended only in the direction of the arrow 270.

In order to adjust the control device 6 via the control motor 130, for instance in the direction of the arrow 270, the third rotary element 80 must be rotated in a direction indicated by a further arrow 271, until the bearing face 96 comes to rest on the stop face 51, and the second rotary element 30 is rotated counter to the spring force of the tension spring 72. This moves the stop 46 of the second rotary element 30 away from the stop 19 of the first rotary element 2. The rotational angle of the third rotary element 80 is limited in the direction of the arrow 271 by the contact of the attachment 101 with the stop plate 182. Even an equally forceful actuation of the core 5 and hence of the first rotary element 2 counter to the direction of the arrow 269 has no effect, or virtually no effect, on the position of the core 64. An actuation of the first rotary element 2 counter to the direction of the arrow 269 can no lnger be transmitted to the second rotary element 30 and hence to the control device 6.

If the control motor 130 is to regulate motion in the other direction, i.e., counter to the direction of the arrow 270, which is provided for in the first exemplary embodiment (FIGS. 1–3), then the bearing face 97 of the third rotary element 80, for instance, must be made to contact the stop face 52 of the second rotary element 30, and the second rotary element 30 must be rotated by the third rotary element 80. The Bowden cable core 64 and the control device 6 are then adjusted counter to the direction of the arrow 270 as well. At the same time, however, the first rotary element 2 is rotated also. If the first part 1 of the transmission device is a cable, then the cable may sag somewhat; or if the first part 1 of the transmission device is a rod linkage, for example, then the operating element 3 is adjusted along with it somewhat, unless precautions against this are made in the rod linkage.

If adjustment via the control motor 130 is to be made in only one direction, then only one of the stop faces 51, 52 on the second rotary element 30 and only one of the bearing faces 96, 97 of the third rotary element 80 are needed.

If the control motor 130 is not triggered, then the reverse torsion spring means assures that the third rotary element 80 is returned to its position of repose. Since in the regulated operating state in the first exemplary embodiment (FIGS. 1 and 2) the Bowden cable core 64 and the control device 6 can be adjusted by the control motor 130 in both the direction of the arrow 270 and counter to it, the third rotary element 80 must be capable of being rotated out of its position of repose in both rotational directions from there, in each case up to a maximum angle. After the deflection of the third rotary element 80 in one direction, the reverse torsion spring means must be capable of restoring the third rotary element 80 in the opposite direction, and after deflection in the other direction, the reverse torsion spring means 155, 175 must likewise be capable of returning the third rotary element 80 in the opposite direction to its position of repose. The position of repose of the third rotary element 80 may extend over a certain rotational angle, depending on the design.

In the second exemplary embodiment (FIGS. 4 and 5), an adjustment of the Bowden cable core 64 and control device 6 by the control motor 130 is provided for only one direction, namely the direction of the arrow 270. It is accordingly sufficient if the reverse torsion spring means 155 is capable of restoring the third rotary element 80 in one one direction, that is, counter to the direction of the arrow 271. The reverse torsion spring means of the second exemplary embodiment (FIGS. 4 and 5) therefore includes only the reverse torsion spring 155.

In the first exemplary embodiment (FIGS. 1 and 2), if the third rotary element 80, in the regulated operating state, is rotated counter to the direction indicated by the arrow 271 out of its position of repose, the reverse torsion spring 175, which is one component of the reverse torsion spring means, is tensed by means of the attachment 102, which comes to rest on the second spring end 180 of the reverse torsion spring 175. The spring end 180 lifts from the stationary stop 184. The third rotary element can be rotated counter to the force of the reverse rotation spring 175 far enough that the second spring end 180, or part of the third rotary element 80, comes to rest on a stationary stop. If the third rotary element was rotated out of its position of repose counter to the direction of the arrow 271, then the restoring spring 175 can rotate the third rotary element 80 back again, until the second spring end 180 comes to rest on the stationary stop 184. Because of the stop 184, the reverse torsion spring 175 can be provided with an initial tension in the installed state.

In both exemplary embodiments, the third rotary element in the regulated operating state can be rotated out of its position of repose in the direction of the arrow 271 by the control motor 130. The reverse torsion spring means attempts to rotate the third rotary element 80 back into its position of repose. The reverse torsion spring 155, as part of the reverse torsion spring means, can act indirectly on the third rotary element 80, via the plate wheel 142 and the second drive wheel 144 (FIGS. 1 and 2) or via the drive wheel 144 alone (FIGS. 4 and 5). The reverse torsion spring 155 acts upon the third rotary element 80 counter to the direction of the arrow 271 until the position of repose is attained. In FIGS. 4 and 5, the reverse torsion spring 155 acts directly upon the second drive wheel 144, and via it then upon the third rotary element 80. To allow the reverse torsion spring 155 to act upon the third rotary element 80 in FIGS. 1 and 2, the first stop end 167 of the plate wheel 142 must come to rest on the first stop edge 171 of the drive wheel 144. Additionally, however, in the first exemplary embodiment (FIGS. 1 and 3) the third rotary element 80 must be capable of being adjusted by the control motor 130 past the position of repose defined by the reverse torsion spring 155, in the direction counter to the arrow 271. This happens in the first exemplary embodiment in that the drive wheel 144 can be rotated still farther relative to the plate wheel 142, causing the stop edge 171 to move away from the stop end 167. The drive wheel 144 can be rotated relative to the plate wheel 142 until on the other side the second stop edge 172 comes to rest on the second stop end 168 of the plate wheel 142.

In the first exemplary embodiment (FIGS. 1-3), on the one hand the reverse torsion spring 155 is supposed to be capable of rotating the third rotary element 80 counter to the direction of the arrow 271 back into the position of repose with sufficient force; on the other hand, it must be assured that the reverse torsion spring 155 does not rotate the third rotary element past its position of repose, yet as described above, continued rotation of the third rotary element 80 past this position of repose by the control motor 130 must still be possible.

To prevent the reverse torsion spring 155 from being capable, despite its initial tension, of rotating the third rotary element 80 backward past its position of repose, a catch mechanism is provided. The catch mechanism substantially comprises the plate wheel 142 and the star wheel 210. The number and angle of possible rotations of the plate wheel 142 are determined by the number of notches 226, 227 (FIG. 3) and indentations 222, 223 of the star wheel 210.

The plate wheel 142 cannot be rotated out of the position shown in FIG. 3 counter to the direction of and arrow 280 because the edge 232 of the plate wheel 142 is resting on the circumference 216 of the star wheel 210. If the plate wheel 142 is rotated out of the position shown if FIG. 3 in the direction of the arrow 180, then the dog 190 of the plate wheel 142, by engaging the first notch 226, rotates the star wheel 210 one increment farther, until the circumference 215 of the plate wheel 142 engages the first indentation 222 of the star wheel 210. As a result, a further rotation of the plate wheel 142 in the direction of the arrow 280 is enabled, until the dog 190 of the plate wheel 142 again rotates the star wheel 210 by one more increment by engaging the second notch 227. The circumference 215 of the plate wheel 142 thereupon engages the second indentation 223 of the star wheel 210. This enables a further rotation of the plate wheel 142 in the direction of the arrow 280, until the third rotary element 80 (FIGS. 1 and 2), with it attachment 101, strikes the stop plate 182. Depending on the desired rotational angle of the plate wheel 142, one notch 226, 227 or two or more notches 226, 227 may be provided in the star wheel 210. A correspondingly matched number indentations 222, 223 should then be provided.

The first drive wheel 131 joined to the rotor 132 of the control motor 130 turns the second drive wheel 144, which in turn can turn the third rotary element 80. The first drive wheel 131 meshes with the first disk portion 169 of the second drive wheel 144, and the second disk portion 170 of the second drive wheel 144 meshes with the third rotary element 180 via toothed profiles, and transmits a torque, generated by the rotor 132 of the control motor 130, to the third rotary element 80. However, the transmission of the torque may instead be effected by partly or completely replacing the toothed profiles of the drive wheels 131, 144 and of the third rotary element 80, for instance with friction linings, as a result of which a torque could be transmitted by friction.

The first reverse torsion spring 155 acts indirectly on the third rotary element 80 via the drive wheel 144. Because of the gear ratio between the drive wheel 144 and the third rotary element 80, this has the advantage that a restoring moment generated by the reverse torsion spring 155 is likewise stepped up or down, so that the restoring moment of the reverse torsion spring 155 can be lesser by design, in accordance with the gear ratio.

The reverse torsion spring 175 (FIGS. 1 and 2) acts directly upon the third rotary element 80. This has the advantage, especially if only a relatively small deflection of the reverse torsion spring 175 is intended, that a relatively strong flat strip can be used for this spring because of the relatively slight deflection; as a result, a sufficiently high restoring moment can also be generated upon the third rotary element 80.

In the first exemplary embodiment shown in and described in detail in conjunction with FIGS. 1 and 2, it is possible in the regulated operating state for the second rotary element 30 to rotated by the control motor 130 in both rotational directions. Thus the Bowden cable core 64 and the thus the control device 6 can be adjusted in either direction.

If the rotation of the second and third rotary elements 30, 80 by the control motor 130 is intended to be possible in only one direction, then one of the two reverse torsion springs 155, 175 suffices for the reverse torsion, because in that case the reverse torsion needs to be operative in only one direction. If the reverse torsion means comprises only the reverse torsion spring 155, for instance, as is the case in the second exemplary embodiment (FIGS. 4 and 5), then the catch mechanism, comprising the plate wheel 142 and the star wheel 210, can be omitted, because in that case the reverse torsion spring 155 is capable of rotating the third rotary element 80 backward far enough that the attachment 102 on the third rotary element 80 comes to rest on a stationary stop plate 282, for instance attached to the base plate 120. The second end 157 of the reverse torsion spring 155 can then be disposed directly on the drive wheel 144. If the reverse torsion means comprises only the reverse torsion spring 175, then the stop 184 for the reverse torsion spring 175 on the base plate can be omitted, because the reverse torsion spring 175 can rotate the third rotary element backward far enough that a portion, intended for this purpose, of the third rotary element 80 comes to rest on a stationary stop. The catch mechanism 142, 210 can be omitted as well.

For the reverse torsion, two differently embodied reverse torsion springs 155, 175 were suitably selected in the first exemplary embodiment (FIGS. 1 and 2). However, it is also possible for both of these reverse torsion springs to be embodied and deflected like either the spring 155 or the spring 175. It would also be possible for the two reverse torsion springs 155, 175 to exchange places with one another.

By inserting a second drive wheel 144 between the first drive wheel 131 and the third rotary element 80, it is also possible to keep the center-to-center distance between the rotor 132 of the control motor 130 and the first shaft 110, on which the rotary elements 2, 30 and 80 are disposed, rather short. The first drive wheel 131 is then disposed in such a way with respect to the third rotary element 80 that it does not protrude radially past the outer circumference thereof.

The toothed profile 92 of the third rotary element 80 extends only in the vicinity of the partial ring 87, which provides a certain compensation in weight for the attachments 101, 102, which are disposed somewhat to one side.

The control motor 130 may be a rotary motor, or a linear motor producing a longitudinal motion. It may be driven electrically, hydraulically, pneumatically, or the like.

The apparatus according to the invention can be used with transmission devices between the operating element 3 and the control device 6 for the driving engine, for instance in stationary engines and in self-propelled engines, such as in passenger cars and trucks. The operating element may for example be hand- or foot-actuated. The transmission device, with the operating element and the control device, may be designed in such a way that the operating element returns to an initial position if an operating force disappear. On the other hand, it may instead be such that if the operating force disappears it remains in any previously set position. The driving engine may be any type of engine the output of which is determinable by the control device, an example being an internal combustion engine.

To enable adjusting the output between a minimum and a maximum value, the second rotary element 30 must be rotatable in two rotational directions (FIG. 1) by at least an angle alpha ($\alpha$) between a first terminal position and a second terminal position. It may be provided that this angle alpha ($\alpha$) is attainable only in the unregulated operating state via the operating element 3, or only in the regulated operating state via the control motor 130 and the third rotary element 80. On the other hand, it may also be that the first terminal position, for instance, in one rotational direction is attainable only via the control motor, while the second terminal position is attainable only via the operating element 3. If in the unregulated operating state the output can be adjusted between the maximum and the minimum value via the operating element 3 or Bowden cable core 5, without causing the rotation of the third rotary element 80 and control motor 130, then the recess 94 must be large enough not to prevent a rotation of the second rotary element 30 by the angle alpha ($\alpha$).

As described above, in the apparatus described in terms of the second exemplary embodiment (FIGS. 4 and 5), the Bowden cable core 64 can be adjusted by the control motor 130 in the direction of the arrow 270. This apparatus can therefore serve in a motor vehicle, for example, upon startup and in acceleration, to prevent or limit drive slip between the driven wheels and the road surface. As soon as suitable sensors detect drive slip, i.e., a loss of traction, the control motor 130 is triggered via an electronic control unit. Via the rotary elements 80 and 30 and the Bowden cable core 64, the control motor 130 then adjusts the control device 6 toward reduced output by the driving engine, until the sensors can no longer detect excessive drive slip.

In the apparatus described in conjunction with the first exemplary embodiment (FIGS. 1-3), the Bowden cable core 64 can be adjusted by the control motor 130 in both the direction of the arrow 270 and the opposite direction. In a motor vehicle, for instance, this apparatus can therefore be used not only to prevent drive slip but also to prevent or limit braking slip, resulting from a braking moment of the driving engine, between the driven wheels and the road surface. As soon as suitable sensors detect braking slip, the control motor 130 is again triggered via the electronic control unit, such that via the rotary elements 80 and 30 the control motor adjusts the cable core 64 counter to the direction of the arrow 270 and hence adjusts the control device 6 in the direction of higher output, until the sensors can no longer detect excessive braking slip.

Drive slip may for instance arise if the operating element 3 is actuated overly forcefully in the direction of higher output. Braking slip may arise, for instance, if the operating element 3 is suddenly actuated in the direction of reduced output and/or when a transmission located between the driven wheels and the driving engine is shifted into a lower gear. Both drive slip and braking slip have a negative effect on the performance of the motor vehicle.

When the control motor 130 is triggered via a suitable electronic control unit, then the apparatus can also be used, in a self-propelled engine such as in a passenger car, for instance, for automatic vehicle speed control or for cruise control.

Of many applications for the apparatus, in the version of the first exemplary embodiment (FIGS. 1 and 2), the following example of a possible case can be given, on the following assumptions: Use in a passenger car with the driving engine in the form of an internal combustion engine with externally supplied ignition; a throttle valve in the intake tube as the control device 6; a gas pedal as the operating element 3; and a Bowden cable as the transmission device 1, 66. An adjustment of the control device 3/Bowden cable core 64 in the direction of the arrow 270 represents a reduction in output. An adjustment in the opposite direction effects an increase in output. The restoring spring 266 acts on the control device 6 in the direction of minimal output. The operating force can act on the operating element 3, in this case the gas pedal, counter to the restoring spring 266.

The following conditions are also assumed:

(a) If the operating force disappears, in the unregulated operating state, the output should not drop below an increased idling output; hence reliable operation under all conditions, for instance when the engine is cold, is assured.

(b) In the unregulated operating state, the engine should be adjustable via the operating element 3/ gas pedal without causing the control motor 130 and the third rotary element 80 to rotate as well.

(c) As needed, for instance when the engine is warm, the control motor 130 should be capable via the third rotary element 80 of lowering the actual output to below the increased idling output.

(d) If a set-point output determined by an electronic unit is less than the output equivalent to an instantaneous gas pedal position, for example because driven wheels are spinning, then it should be possible to reduce the output.

(e) At a gas pedal position equivalent to a relatively low output, it should be possible to increase the actual output, for instance in the event of overly high engine braking moment, but for safety reasons, for instance, only up to a firmly defined value.

To meet condition (a), a stop (not shown) on the first rotary element or a stop of the Bowden cable core 5 in the first part of the transmission device, or a stop on the gas pedal, must in particular assure that the restoring spring 266 can retract the control device 6 or the second rotary element 30 in the direction of the arrows 269, 270 only as far as a zero position, corresponding to the increased idling output. The zero position of the second rotary element 30 is shown in FIG. 1 as a dot-dash line 285. To meet condition (b), the recess 94 must in particular be sufficiently large, and the second rotary element 30 must be movable counter to the direction of the arrow 270 via the first rotary element 2 into the terminal position equivalent to maximal output. To this end, the second rotary element 30 must be freely rotatable relative to the third rotary element 80 by an angle delta ($\delta$) (FIG. 1). To meet condition (c), the control motor 130 must in particular be capable, via the third rotary element 80, of adjusting the second rotary element 30 past the zero position in the direction of the arrow 270. This angle in the direction of lesser output is likewise limitable, via stops, to an angle gamma ($\gamma$). To meet condition (d), the control motor 130 must in particular be capable, via the third rotary element 80, of rotating the second rotary element 30 to a variable extent in the direction of the arrow 270. To meet condition (e), the control motor 130 must in particular be capable of rotating the third rotary element out of its position of repose by an angle beta ($\beta$) (FIG. 1) counter to the direction of the arrow 271. By means of a stop, for instance between the third rotary element 80 and the base plate 120, the angle beta ($\beta$) is reliably defined. Depending on the initial position, the second rotary element 30 is rotated maximally by the angle beta ($\beta$) counter to the direction of the arrow 270. Even in the event of a malfunction of the control motor 130 or an error in the control signals acting on the control motor, the angle beta ($\beta$) and hence the output cannot be unintentionally exceeded.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An apparatus having a control motor (130) for intervention into a transmission device between an operating element and a control device that determines the output of a driving engine, wherein the operating element is operatively connected to a first rotary element (2) and the control device is operatively connected to a second rotary element (30), and a tension spring (72) which acts on said first rotary element and on said second rotary element in such a manner that said first and second rotary elements tend to execute a rotary motion relative to one another until a stop of one rotary element comes to rest on a stop of the other rotary element, a third rotary element (80) with which said control motor (130) is operatively connected for rotation of said second rotary element (30), a coupling (48, 51, 52, 94, 96, 97) positioned between said second and third rotary elements (30, 80), and said coupling is operative in certain positions of said second and third rotary elements (30, 80) relative to one another.

2. An apparatus as defined by claim 1, in which said first, second and third rotary elements (2, 30, 80) are axially disposed relative to one another.

3. An apparatus as defined by claim 1, in which said second rotary element (30) is rotatable by the control motor (130) via said third rotary element (80) in a direction of a reduced output of said driving engine and in an opposite direction of increased output of said driving engine.

4. An apparatus as defined by claim 2, in which said second rotary element (30) is rotatable by the control motor (130) via said third rotary element (80) in a direction of a reduced output of said driving engine and in an opposite direction of increased output of said driving engine.

5. An apparatus as defined by claim 3, in which the rotation of the second rotary element (30) by the control motor (130) in the direction of increased output is limited to a maximum allowable angle of rotation beta (β).

6. An apparatus as defined by claim 3, in which the rotation of the second rotary element (30) by the control motor (130) in the direction of lesser output of the driving engine is limited to a maximum allowable angle of rotation gamma (γ).

7. An apparatus as defined by claim 1, in which said second rotary element (30) is rotatable relative to said third rotary element (80).

8. An apparatus as defined by claim 1, in which said coupling comprises an eccentrically disposed knob (48) protruding axially from said second rotary element (30), which engages a recess (94) of said third rotary element (80), wherein said recess (94) does not extend over the entire circumference of said third rotary element and as seen in the circumferential direction at least one end of said recess (94) serves as a bearing face (96, 97) for said knob (48), and that said recess (94) is longer in length in a circumferential direction than a length of said knob (48) in a circumferential direction.

9. An apparatus as defined in by claim 1, which includes at least one reverse torsion spring means (155, 175) and said third rotary element (80) is restorable into a position of repose by said at least one reverse torsion spring means (155, 175) acting upon said third rotary element (80).

10. An apparatus as defined by claim 9, in which said reverse torsion spring means (155, 175) is operative in only one direction of rotation.

11. An apparatus as defined by claim 9, in which depending on a position of said third rotary element (80), said at least one reverse torsion spring means (155, 175) is operative in either direction of rotation.

12. An apparatus as defined by claim 9, in which said at least one reverse torsion spring means is a single reverse torsion spring (175) having first and second spring ends (177, 180), said first spring end (177) is supportedly attached to a base plate (120) of a housing and said second spring end (180) acts via an attachment (102) on said third rotary element (80) and upon said third rotary element (80) in one reverse rotation direction.

13. An apparatus as defined by claim 12, in which the rotation of said third rotary element (80) can be effected in a reverse rotation direction, until a bearing face of said third rotary element (80) comes to rest on a bearing face attached to said base plate of said housing.

14. An apparatus as defined by claim 12, in which, depending on a position of said third rotary element (80), said second spring end (180) of said reverse torsion spring (175) can come to rest on a stop (184) attached to the housing.

15. An apparatus as defined by claim 14, in which an effectiveness of said reverse torsion spring (175) upon said third rotary element (80) is limited by a contact of said second spring end (180) with a stop (184) attached to said base plate of said housing.

16. An apparatus as defined by claim 1, in which said third rotary element (80) is rotatable by means of said control motor (130).

17. An apparatus as defined by claim 12, in which said reverse torsion spring (175) is subjected to bending.

18. An apparatus as defined by claim 17, in which said reverse torsion spring subjected to bending is formed in a circular arc and is disposed in axial alignment with said third rotary element (80).

19. An apparatus as defined by claim 17, in which said reverse torsion spring subjected to bending is a spiral spring, which is disposed in axial alignment with said third rotary element (80).

20. An apparatus as defined by claim 9, which includes a gear means, and said third rotary element (80) is restorable to a position of repose by means of said at least one reverse torsion spring (175) acting indirectly upon said third rotary element (80) via said gear means (131, 144).

21. An apparatus as defined by claim 20, in which said at least one reverse torsion spring means comprises a reverse torsion spring (155) having first and second ends (156, 157), said first end (156) is supportedly attached to a base plate of a housing and said second end (157) acts in one reverse rotation direction upon said third rotary element (80) via said gear means (144) of the gear.

22. An apparatus as defined by claim 21, in which the rotation of said third rotary element (80) in the reverse rotation direction is effected until an attachment (102) of said third rotary element (80) comes to rest on a stop plate (282) attached to said base plate of said housing.

23. An apparatus as defined by claim 21, in that an effectiveness of said reverse torsion spring (155) limited by a catch mechanism (142, 210).

24. An apparatus as defined by claim 9, in which said control motor (130) can rotate said third rotary element (80) counter to said reverse rotation direction effected by said at least one reverse torsion spring means (155).

25. An apparatus as defined by claim 21, in which said reverse torsion spring (155) is subjected to bending.

26. An apparatus as defined by claim 25, in which said spring subjected to bending is a spiral spring, which is disposed in axial relationship with said drive wheel means (144).

27. An apparatus as defined by claim 1, in which said control motor (130), the rotary elements (2, 30, 80) and the tension spring (72) are disposed on a base plate (120).

28. An apparatus as defined by claim 27, in which said base plate (120) has two sides (124, 125), and said control motor (130) is disposed at least partly on one side (125) and rotary elements (2, 30, 80) and said tension spring (72) are disposed at least partly on the other side (124).

29. An apparatus as defined by claim 28, in which said apparatus includes a cover on at least one side of said base plate formed by at least one hood (252, 256), which includes various functionally necessary recesses (254, 257).

30. An apparatus as defined by claim 27, in which said base plate (120) includes at least one recess (261, 262) in the base plate (120) for fastening said apparatus to a support means.

31. An apparatus as defined by claim 20, in which said gear means comprises first and second drive wheels (131, 144), wherein said first drive wheel (131) is connected to said control motor (130) and meshes with a first disk portion (169) of said second drive wheel (144), and that a second disk portion (170) of said second drive wheel (144) meshes with said third rotary element (80).

32. An apparatus as defined by claim 31, in which said first drive wheel (131), said first and second disk portions (169, 170) of said second drive wheel (144) and said second rotary element (80) are each provided with a toothed profile (92, 173).

33. An apparatus as defined by claim 32, in which said toothed profile (92) of said third rotary element (80) has a circumference which extends over an angular range of less than 360°.

34. An apparatus as defined by claim 31, in which said first drive wheel (131) is located inside a recess within an outer circumference of said third rotary element (80).

35. An apparatus as defined by claim 1, in which said tension spring (72) is embodied as a spiral spring.

36. An apparatus as defined by claim 35, in which said first and second rotary elements (2, 30) are disposed in axial alignment with each other, and said tension spring (72) is disposed coaxially with said first and second rotary elements (2, 30).

37. An apparatus as defined by claim 36, in which said first and second rotary elements (2, 30) are mutually rotationally guided, said tension spring (72) is located between said first and second rotary elements, and that said first and second rotary elements and said tension spring form a structural unit.

38. An apparatus as defined by claim 1, which includes a travel measuring system (265) for detecting a position of said control device.

* * * * *